D. H. GOLDING.
PULLING DEVICE.
APPLICATION FILED OCT. 29, 1918.
1,300,953.
Patented Apr. 15, 1919.
2 SHEETS—SHEET 1.
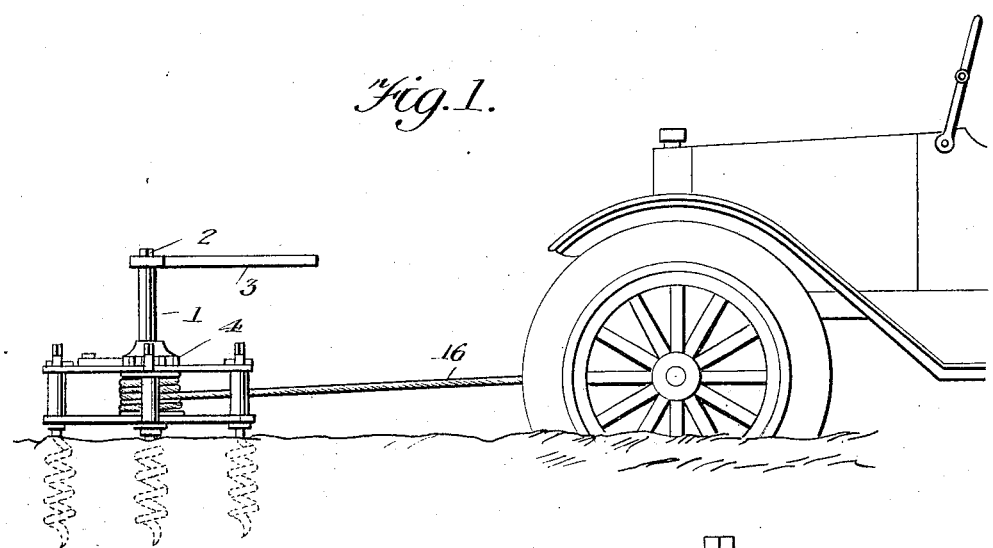
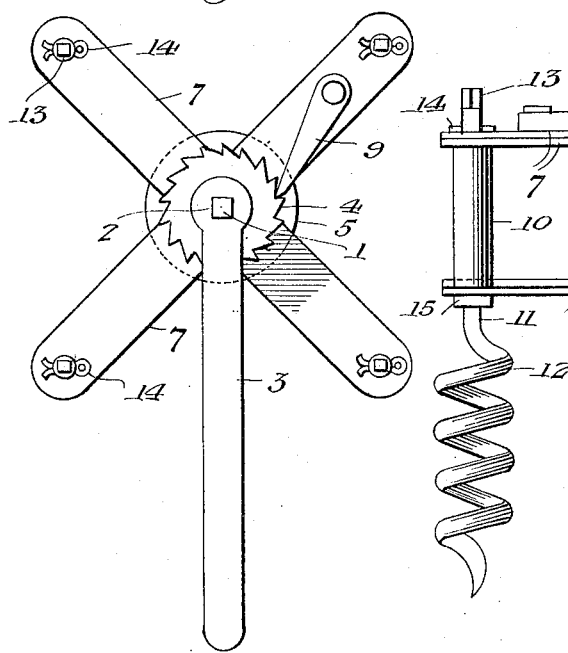
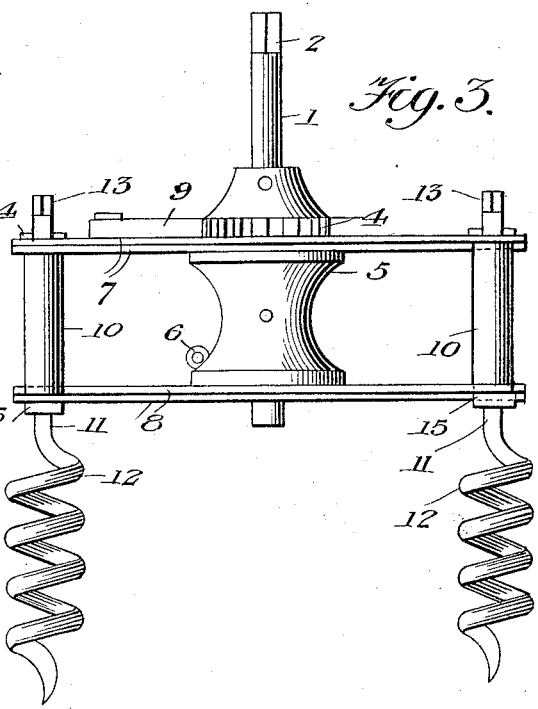
Witness
Everett Lloyd Jr.
Inventor
David H. Golding
By Victor J. Evans
Attorney D. H. GOLDING.
PULLING DEVICE.
APPLICATION FILED OCT. 29, 1918.
1,300,953.
Patented Apr. 15, 1919.
2 SHEETS—SHEET 2.
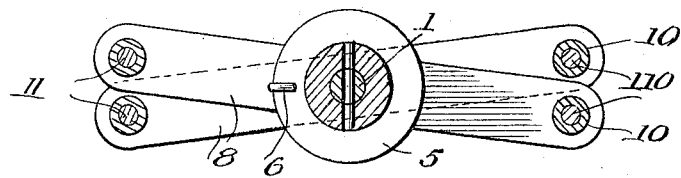
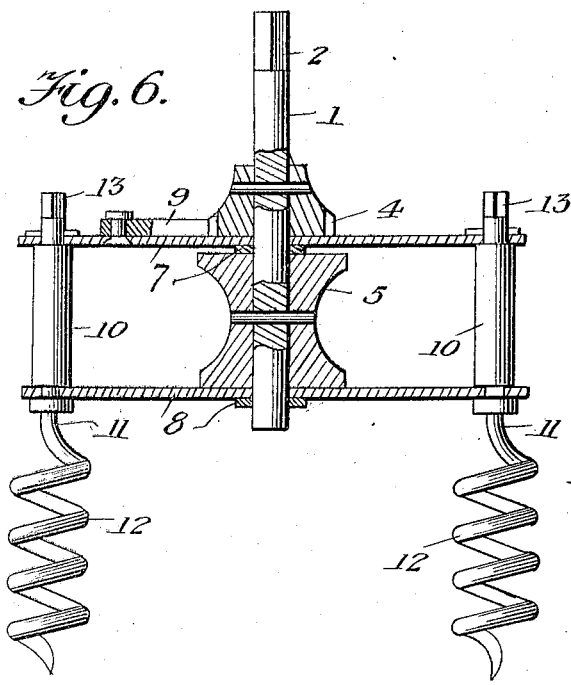
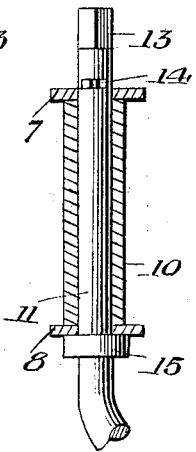
Inventor
David H. Golding
Witness
Everett Lloyd Jr.
By Victor J. Evans
Attorney

UNITED STATES PATENT OFFICE.

DAVID H. GOLDING, OF VIRDEN, MANITOBA, CANADA.

PULLING DEVICE.

1,300,953.     Specification of Letters Patent.     Patented Apr. 15, 1919.

Application filed October 29, 1918. Serial No. 260,207.

*To all whom it may concern:*

Be it known that I, DAVID H. GOLDING, a citizen of the Dominion of Canada, residing at Virden, in the Province of Manitoba and Dominion of Canada, have invented new and useful Improvements in Pulling Devices, of which the following is a specification.

My present invention has relation to pulling devices, and while it is designed more especially for pulling automobiles out of quagmires it may be used too for many other purposes such as stretching wire and hoisting the carcasses of cattle and hogs at killing time.

One of the objects of the invention is the provision of a pulling device embodying means whereby it may be firmly fixed to the earth and this expeditiously and in such manner that after a pulling operation the device may be readily disengaged from the earth.

Another object of the invention is the provision of a pulling device adapted when not in use to be folded into small compass so as to take up but little space in an automobile or in storage or shipment.

Another object is the provision of a pulling device that is extremely simple in construction and yet is adapted to enable a single person to pull an automobile out of a quagmire or to powerfully stretch wire or to raise a heavy carcass.

Other objects and advantages of the invention will be fully understood from the following description and claims when the same are read in connection with the drawings, accompanying and forming part of this specification, in which:

Figure 1 is a view showing the manner in which my novel device is affixed to the ground and is used in the pulling of an automobile out of a mud hole or the like, Fig. 2 is a top plan view of the device *per se* as it appears in a state for use, Fig. 3 is a view showing the device with the hand lever removed and the major portion of the device folded or collapsed for compact storage, carriage, or shipment, Fig. 4 is a vertical section taken in the plane indicated by the line 4—4 of Fig. 3, Fig. 5 is an enlarged detail section taken through the shank of one of the augers and also through the spacing sleeve between upper and lower bars of the frame, Fig. 6 is a vertical diametrical section taken through the central shaft, the ratchet member, the capstan or winding member and the frame bars of the machine and showing two of the augers.

Similar numerals of reference designate corresponding parts in all of the views of the drawings.

Among other elements my novel pulling device comprises a central vertical shaft 1. The upper end of this shaft is of angular form in cross section, as indicated by 2 for the application of a hand lever 3; said lever 3 being readily removable when the device is to be put out of commission. At an intermediate point of its height the shaft 1 is provided with a ratchet member 4, keyed thereto preferably in a detachable manner, and suitably fixed upon the shaft below the ratchet member is a capstan 5, having an eye 6 or any other suitable means through the medium of which a cable may be connected to it.

Pivoted on the shaft 1 and arranged in lapped relation between the ratchet member 4 and the capstan are upper frame bars 7, and similarly pivoted on the shaft and disposed below the capstan 5 are lower frame bars 8. The said frame bars are preferably of metal, though obviously they may be of any other suitable material without involving departure from the scope of my claimed invention.

Pivoted on one of the upper bars 7 is a pawl 9 adapted to coöperate with the ratchet member 4 in preventing retrograde rotation of the capstan 5.

Interposed between the upper bars 7 and the lower bars 8 are spacing sleeves 10, preferably of metal, and extending through the lower and upper bars at points adjacent to the outer ends of the latter are the shanks 11 of augers 12, which augers are disposed under the frame and are designed to be turned into the earth so as to strongly affix the pulling device thereto. When ready for use the frame of the device is of general cruci-form configuration, and consequently it will be seen that the augers 12 are spaced apart to a considerable extent which is advantageous inasmuch as it enables the augers to more strongly fasten the device to the earth and precludes the possibility of the device being released from the earth under an extraordinarily hard pull. At its upper end each auger shank 11 is provided with an angular portion 13 adapted for the application of a wrench so that each auger may be separately turned into the earth and this expeditiously and with but little effort on the part of the operator.

Cotter pins 14 are shown as securing the shanks of the augers in the frame bars 7 and 8 and at intermediate points the said shanks are provided with enlargements 15 upon which the lower frame bars 8 are supported. The cotter pins are readily removable and are disposed for such reasons because they permit of the augers being detached from the frame bars when it is desired to reduce the device to a knocked down state, but it is obvious that the detachable connection of the augers is not of the essence of my invention and that therefore the augers may be permanently connected with the frame without affecting my invention. Likewise the ratchet member 4 may when deemed expedient be permanently secured in any suitable manner on the shaft 1.

As before described the frame bars 7 and 8 are pivoted on the shaft 1, and consequently when the device is to be put away or stored for storage or shipment one pair of bars may be readily swung against the other pair of bars as shown in the drawings so as to materially reduce the size of the device in the plane.

When desirable my novel pulling device may be used in combination with a cable alone or in combination with a cable and suitably disposed pulleys. These latter and the arrangement thereof are however, not comprised in my invention and I have therefore deemed it unnecessary to illustrate the same.

In using my novel device for pulling an automobile out of a quagmire or from a depression in the earth I fix the device to the earth at a suitable distance from the automobile, and then interpose a cable 16 between the automobile and the capstan 5. With this done the capstan is turned continuously in one direction through the medium of the long and powerful lever 3 and in consequence one or two persons are enabled to draw the automobile out of the mud or out of a depression, as the case may be, yet by very little effort.

By virtue of my novel device being provided with the augers spaced considerably apart no extraneous device or devices such as anchors and cables are necessary in order to maintain the device in working position against the tremendous draft imposed on the device incidental to the described movement of a heavy automobile.

Having described my invention what I claim and desire to secure by Letters-Patent is:

1. A pulling device comprising a shaft adapted for the connection and winding of a cable, upper and lower frame bars pivoted on the shaft and arranged in spaced relation; means connecting one lower bar with one upper bar whereby one pair of bars is adapted to be swung to and from a position at right angles to the other pair of bars, and augers adapted to be turned into the ground and having shanks journaled in the outer portions of the pairs of bars.

2. A pulling device comprising a shaft, a capstan and a ratchet member fixed thereon, upper frame bars pivoted on the shaft between the capstan and the ratchet member, lower frame bars pivoted on the shaft below the capstan, a pawl mounted on one of the upper frame bars and adapted to coöperate with the ratchet member, spacing sleeves interposed between lower and upper frame bars, and augers extending through the frame bars and the spacing sleeves and having enlargements below the lower frame bars and also having means above the upper frame bars whereby the augers are connected to the frame bars and are adapted to be turned about their axes therein.

In testimony whereof I affix my signature.

DAVID H. GOLDING.

Copies of this patent may be obtained for five cents each, by addressing the "Commissioner of Patents Washington, D. C."